(12) United States Patent
Watanabe

(10) Patent No.: US 6,726,890 B1
(45) Date of Patent: Apr. 27, 2004

(54) CATALYST FOR OXIDIZING REFORMED GAS

(75) Inventor: Masahiro Watanabe, 2421-8, Wadamachi, Kofu-shi, Yamanashi-ken 400-0001 (JP)

(73) Assignees: Tanaka Kikinzoku Kogyo K.K., Tokyo (JP); Masahiro Watanabe, Yamanashi-Ken (JP)

( * ) Notice: Subject to any disclaimer, the term of this patent is extended or adjusted under 35 U.S.C. 154(b) by 0 days.

(21) Appl. No.: 09/462,475

(22) PCT Filed: Jun. 10, 1999

(86) PCT No.: PCT/JP99/03093

§ 371 (c)(1), (2), (4) Date: Jan. 14, 2000

(87) PCT Pub. No.: WO99/64153

PCT Pub. Date: Dec. 16, 1999

(30) Foreign Application Priority Data

Jun. 10, 1998 (JP) ............................................. 10/162412

(51) Int. Cl.[7] ................................................. B01J 29/06
(52) U.S. Cl. ................... 423/247; 423/246; 423/437.2; 502/64; 502/66; 502/74; 502/78
(58) Field of Search ............................. 502/64, 66, 74, 502/78; 423/246, 247, 437.2

(56) References Cited

U.S. PATENT DOCUMENTS 3,884,838 A * 5/1975 Fleming et al.
5,189,005 A * 2/1993 Watanabe et al.
6,117,581 A * 9/2000 Shelef
6,168,772 B1 1/2001 Watanabe

FOREIGN PATENT DOCUMENTS

| JP | 5 258764 A | 10/1993 |
| JP | 7-256112 A * | 10/1995 |
| JP | 8-2902 A | 1/1996 |
| JP | 9 299805 A | 11/1997 |

OTHER PUBLICATIONS

Database of Zeolite Structures; Atlas of Zeolite Framework Types; MOR[online]. No data available. [retrieved on Apr. 6, 2001]. Retrieved from the Internet:<URL: http://www.iza–structure.org/databases/>.*

* cited by examiner

Primary Examiner—Tom Dunn
Assistant Examiner—Christina Ildebrando
(74) Attorney, Agent, or Firm—Rothwell Figg Ernst & Manbeck

(57) ABSTRACT

The present invention provides a catalyst for oxidizing reformed gas, which catalyst can selectively oxidize carbon monoxide—which is contained in the reformed gas used as a fuel of a solid polymer fuel cell and which acts as a catalyst poison of the fuel cell—into carbon dioxide with high performance. The reformed gas is oxidized by use of the catalyst of the present invention, which catalyst is characterized in that M-type mordenite, among different types of zeolite, is used as a carrier and a bimetallic alloy metal system containing platinum and an alloy-forming metal other than platinum is supported by the carrier, wherein the amount of the alloy-forming metal in the alloy is 20–50 at. %.

20 Claims, No Drawings

CATALYST FOR OXIDIZING REFORMED GAS

BACKGROUND OF THE INVENTION

1. Field of the Invention

The present invention relates to a catalyst for oxidizing a reformed gas, which catalyst is used for removing carbon monoxide contained in the reformed gas, which serves as a source of hydrogen for a solid polymer fuel cell.

2. Description of the Related Art

Conventionally, hydrogen gas reformed from methane gas has been widely used as a fuel for a polyelectrolyte fuel cell (hereinafter referred to as a "PEFC") containing a platinum electrode catalyst. Such a reformed gas is used in consideration of cost.

However, the reformed gas contains carbon monoxide which is inevitably formed during reformation. The carbon monoxide content of the reformed gas is as low as 1%, but it has been known that the small amount of carbon monoxide acts as a catalytic poison for a platinum electrode catalyst and that poisoning of the catalyst results in seriously deteriorated performance of the PEFC.

In order to solve this problem, the carbon monoxide content of the reformed gas must be reduced by a factor of 100 or more. To meet such a demand, Gottesfeld et al. have proposed "a method for oxidizing existing carbon monoxide into carbon dioxide in advance by use of a platinum-on-γ-alumina catalyst" and "a method for oxidizing existing carbon monoxide into carbon dioxide on an electrode catalyst of a fuel cell" by mixing the reformed gas supplied to the cell with 2% or thereabout oxygen gas.

However, these methods proposed by Gottesfeld et al. cause reduction in efficiency of fuel use, because in the course of oxidation of carbon monoxide into carbon dioxide a large amount of hydrogen gas which has to serve as a fuel is also oxidized. A possible explanation for this phenomenon is that catalyst particles carried by carbon black (which serves as an electrode catalyst) or by γ-alumina are exposed at the surface of the carrier, and therefore, not only carbon monoxide but also hydrogen which should serve as a fuel is simultaneously adsorbed onto the catalyst and oxidized. Generally, the rate of adsorption is proportional to the partial pressure of gas. In the present case, hydrogen, a primary component of the reformed gas, has a high partial pressure, and therefore the consumption rate of hydrogen becomes high.

In order to solve this problem, the present inventor has previously proposed a catalyst for oxidizing the reformed gas, which can selectively oxidize carbon monoxide in the reformed gas serving as a fuel for a fuel cell, and can thereby suppress the loss of hydrogen caused by oxidation, wherein the catalyst is supported by a carrier having pores of molecule size (Japanese Patent Application Laid-Open (kokai) No. 7-256112). In that publication, the inventor disclose that a mixture or alloy of one or more species selected from among platinum, palladium, rhodium, iridium, ruthenium, nickel, cobalt, and iron is preferably used as the catalyst.

The PEFC, employing the above-described reformed gas as a fuel, may also greatly contribute toward realizing practical use of an electric automobile, which may find itself a mainstream of a ZEV (Zero Emission Vehicle) emitting no toxic substances, including nitrogen oxides. An electric vehicle employing the PEFC may run for a drastically prolonged distance as compared with a conventional electric automobile employing a lead storage battery. If electric automobiles employing nickel-hydrogen storage batteries so as to overcome, to some extent, the problem of short running distance become popular, an enormous amount of charging power will be required, and the amount of carbon dioxide and nitrogen oxides discharged in the course of thermal power generation for charging the electric automobiles will increase, which may make the overall contribution toward reducing environmental pollution insufficient.

In contrast, the PEFC, having high efficiency in power generation and capable of reducing the discharge of carbon dioxide, employs hydrogen as a fuel (a reformed gas), which is obtained by conversion from methanol serving as a starting material of a fuel. Obtaining hydrogen from methanol is not difficult in consideration of modern technology, and the conversion is performed in an apparatus that can be loaded on a vehicle. When the technique is applied to an electric automobile, existing gas station facilities can be used, and an electric automobile having a long running distance can be provided.

In order to make use of the PEFC in an electric automobile, the performance of the cell should not vary with the flow rate of hydrogen gas serving as a fuel. When the flow rate of hydrogen gas varies during acceleration or deceleration, insufficient removal of carbon monoxide from a reformed gas may adversely affect the running performance of an electric automobile.

In order to realize stable performance of the PEFC, carbon monoxide in the reformed gas serving as a fuel must be oxidized to thereby eliminate poisoning by carbon monoxide. The present inventor confirmed that zeolite serving as a catalyst carrier is a candidate for solving the above problem, and that a mixture or alloy of one or more species selected from among platinum, palladium, rhodium, iridium, ruthenium, nickel, cobalt, and iron is used as a catalyst for selectively oxidizing carbon monoxide. However, they did not know which type of catalyst is best suited for selective oxidization of carbon monoxide in a reformed gas, which is employed in the PEFC of an electric automobile.

Particularly, a catalyst for oxidizing the reformed gas is demanded to have performance differing from that of general catalysts, and has a purpose of selectively oxidizing carbon monoxide. Therefore, the structure or characteristics of a carrier are very important, and a catalyst element must be appropriately chosen. However, suitable combination of the carrier and catalyst element has not been determined so far.

In view of the foregoing, in an attempt to obtain a more improved selectivity in oxidization of carbon monoxide contained in a reformed gas, the present inventor has studied on possible combinations of a catalyst carrier and a catalyst element which had not been conceived at the time of filing of Japanese Patent Application Laid-Open (kokai) No. 7-256112. Therefore, an object of the present invention is to provide a catalyst for oxidizing a reformed gas with quality that permits use of the gas in a fuel cell of an electric automobile.

SUMMARY OF THE INVENTION

As described above, in order to obtain a catalyst for oxidizing the reformed gas, the catalyst being capable of selectively oxidizing carbon monoxide with high accuracy, the present inventor has proceeded the following thinking process. When zeolite serving as a carrier has pores of molecule size and supports a predetermined species of catalyst in the pores, the catalyst can selectively oxidize carbon monoxide in the reformed gas. The catalyst utilizes the difference in the passage rate of elements of the reformed gas; i.e., hydrogen, oxygen, and carbon monoxide, when these species pass through pores of zeolite serving as the carrier of the catalyst.

Accordingly, elements having a smaller size with respect to the pore size of zeolite pass through pores rapidly, and those having a larger size pass through the pores slowly. Therefore, in consideration of the constitutional elements of reformed gas; i.e., hydrogen, oxygen, and carbon monoxide, it is readily understood that hydrogen, the smallest of these, passes through the pores very rapidly as compared with oxygen and carbon monoxide. In addition, regarding polarity of these species, a hydrogen molecule has no polarity and a carbon monoxide molecule has polarity. In this case, zeolite has a large amount of polar groups in the pores, and therefore, a polar molecule species such as carbon monoxide is easily adsorbed onto the inside walls of the pores and oxidized. This means that hydrogen, oxygen, and carbon monoxide undergo different contact times when they contact with catalyst particles supported on inner walls of the pores of zeolite.

As is described above, in the pores of zeolite, hydrogen has shorter contact time with a catalyst as compared with oxygen and carbon monoxide, and thus hydrogen is hardly oxidized. In contrast, oxygen and carbon monoxide pass through the pores slowly as compared with hydrogen, and catalytic oxidation between oxygen and carbon monoxide tends to occur by use of the catalyst.

In view of the foregoing, a carrier preferably has micropores such that hydrogen in the reformed gas passes through them quickly. When the pore size increases, the passage rate of hydrogen also increases, and the loss of hydrogen may decrease. Meanwhile, carbon monoxide must be effectively oxidized by oxygen. Therefore, key points to determine the pore size of zeolite serving as a carrier are that the pores must allow hydrogen in the reformed gas to pass therethrough quickly and that oxygen and carbon monoxide smoothly enter the pores for ensured catalytic oxidation of carbon monoxide.

The present inventor has performed earnest studies on a carrier satisfying the above requirements, and have found that, among different types of zeolite, mordenite is very useful. Zeolite generally has micro-pores of a size of 3–9 Å, and is classified into five types in accordance with the size. Mordenite, one of the types of zeolite, is generally called M-type and has a mean pore size of about 7 Å. In the present invention, mordenite is chosen and used as a carrier.

In addition, the present inventor has found that even when mordenite is used as a carrier, if a catalyst is not suitably selected, it is impossible to achieve the object of the present invention; i.e., to obtain a reformed gas with certain quality that permits use thereof as a fuel of fuel cells for an automobile. In other words, a catalyst for oxidizing the reformed gas used for a fuel cell of an automobile must exert constant catalyst performance from low to high temperature ranges and must not be easily affected by a change in the flow rate of gas. Thus, the object of the present invention is attained only when mordenite is as a carrier and the catalyst satisfies a certain compositional requirement.

More specifically, the present inventor has found that a bimetallic catalyst, such as a platinum-ruthenium catalyst or a platinum-iron catalyst, is very useful for selectively oxidizing carbon monoxide in the reformed gas over a wide temperature range, as compared with a conventionally used monometallic catalyst such as a platinum or palladium catalyst. Particularly, when a platinum—20–50 at. % alloy metal is used as a catalyst, the catalyst was found to realize excellent temperature stability and selective oxidization of carbon monoxide in the reformed gas, with other requirements being met in a well-balanced manner.

DESCRIPTION OF PREFERRED EMBODIMENTS

Hereinbelow, a description will be given of the case in which mordenite is used as a carrier and a platinum—20–50 at. % alloy metal is used as a catalyst. As will be demonstrated, this combination provides remarkably excellent, selective oxidization of carbon monoxide in a reformed gas. A platinum-alloy-based bimetallic catalyst is chosen, because the catalyst can increase the rate of oxidation of the reformed gas. The rate of oxidation by the bimetallic catalyst was compared with that by a platinum-on-mordenite catalyst, a palladium-on-mordenite catalyst, and a platinum-on-alumina catalyst. The results of comparison are shown in Table 1. The present invention will be described with reference to a test and the results obtained therefrom in which mordenite is used as a carrier for carrying a platinum-ruthenium catalyst (platinum—30 at. % alloy metal) to thereby form a platinum alloy bimetallic catalyst.

TABLE 1

Reaction temperature: 200° C.

| Metallic catalyst | Carrier | Contact Time (W/F) | CO conversion (%) |
|---|---|---|---|
| Pt-Ru | Mordenite | 0.03 gscm$^{-3}$ | 80.4 |
| Pt | | 0.12 gscm$^{-3}$ | 79.2 |
| Pd | | | 20.8 |
| Pt | Alumina | | 51.0 |

Contact time:
  W/F 0.03 gscm$^{-3}$
  (W: 25 mg, F: 50 cm$^3$·min$^{-1}$)
  W/F 0.12 gscm$^{-3}$
  (W: 100 mg, F: 50 cm$^3$·min$^{-1}$)
The amount of supported catalyst:
  Each carrier supports metallic catalyst in an amount of 6 wt %.

As shown above, contact time is represented by W/F, which is widely used in the field of catalysis chemistry. W refers to the weight of supported catalyst (total of the weight of metallic catalyst and carrier), and F refers to the flow rate of reaction gas. Thus, W/F refers to the time during which a certain amount of gas contacts with a certain amount of catalyst. In the parentheses appearing below Table 1, W represents the amount of catalyst which is used in the test, and F represents the flow rate of reformed gas per unit time. Hereinafter the same definitions are applied to W and F. In the case of the platinum-ruthenium-supported catalyst, the supported catalyst is reduced to ¼ the amount as used in other catalysts.

As is apparent from Table 1, even when the contact time is ¼, the platinum-ruthenium catalyst is excellent in CO conversion as compared with the platinum catalyst supported by alumina; i.e., a conventional catalyst, or other catalysts, so long as the flow rate of gas is constant. In other words, the platinum-ruthenium catalyst is excellent in CO conversion even when the amount of supported catalyst is reduced by a factor of four, as compared with other catalysts.

Accordingly, even when the contact time is ¼, the platinum-ruthenium-on-mordenite catalyst is excellent in CO conversion, as compared with the platinum-on-mordenite and palladium-on-mordenite catalysts. This result shows that a platinum-alloy bimetallic catalyst supported by mordenite can realize an improved oxidation rate of CO in a reformed gas.

Subsequently, the reason why a platinum—20–50 at. % alloy metal is used as a metallic catalyst component is described below. Throughout the specification, the term "platinum—20–50 at. % alloy metal" refers to the case where an alloy of platinum, serving as a catalyst element, contains other metallic elements in an amount of 20–50 at. % with respect to the entire atomic amount of the alloy. Hereinafter, a similar expression is construed as described above. Table 2 shows the measurements of CO conversion rate and selectivity, which were obtained for different atomic amounts of catalyst components.

Table 2

| Composition of catalyst on the basis of atomic amount | Reaction temperature: 150° C. | | |
|---|---|---|---|
| | CO Conversion (%) | $O_2$ Conversion (%) | Selectivity (%) |
| Pt only | 7.0 | 9.8 | 71.4 |
| Pt-10% Ru | 47.5 | 49.3 | 96.3 |
| Pt-20% Ru | 64.4 | 72.9 | 83.4 |
| Pt-30% Ru | 89.7 | 100.0 | 89.7 |
| Pt-40% Ru | 78.6 | 100.0 | 78.6 |
| Pt-50% Ru | 64.0 | 100.0 | 64.0 |
| Pt-60% Ru | 58.4 | 61.2 | 94.5 |
| Pt-70% Ru | 57.8 | 59.5 | 97.1 |
| Ru only | 57.0 | 58.0 | 98.7 |

Composition of reformed gas:
  CO 1%, $O_2$ 0.5%, $H_2$ balance
Contact time:
  W/F 0.03 gscm$^{-3}$
  (W: 25 mg, F: 50 cm$^3$·min$^{-1}$)
Pt—X% Ru:
  Containing Ru in an amount of X at. %

Table 2 shows data, including CO conversion and selectivity, for the case where a platinum-ruthenium alloy is used as a catalyst component, the atomic constitutional ratio of the catalyst component is varied at a reaction temperature of 150° C., the component is supported by mordenite, and the thus-obtained catalysts are used as catalysts for selectively oxidizing carbon monoxide in a reformed gas.

As used herein, conversion and selectivity are as described below. A reformed gas contains hydrogen ($H_2$), oxygen ($O_2$), and carbon monoxide (CO). By use of oxygen ($O_2$) in the reformed gas, a catalyst for selectively oxidizing carbon monoxide in the reformed gas according to the present invention converts carbon monoxide (CO) into carbon dioxide ($CO_2$), which is not a catalyst poison. If carbon monoxide (CO) is not selectively oxidized, oxygen ($O_2$) in the reformed gas oxidizes hydrogen ($H_2$) serving as a fuel of PEFC into water ($H_2O$), to thereby reduce fuel efficiency.

As used herein, the term "CO conversion (%)" refers to the percentage of carbon monoxide molecules converted into carbon dioxide molecules, with respect to the entirety of the carbon monoxide molecules in the reformed gas. The term "$O_2$ conversion (%)" refers to the percentage of oxygen molecules that are consumed, with respect to the entirety of the oxygen molecules in the reformed gas. The term "selectivity (%)" refers to the percentage of oxygen molecules which are used for selectively oxidizing carbon monoxide, with respect to the entirety of the oxygen molecules in the reformed gas.

As is apparent from Table 2, when the platinum-ruthenium alloy catalyst containing ruthenium in an amount of 20–50 at. % is used, CO conversion becomes 60% or more. When a conventional platinum-on-alumina catalyst is used, CO conversion of 60% or more cannot be attained. Therefore, the present inventor has decided that a platinum—20–50 at. % alloy metal is preferable as a metallic catalyst, which attains CO conversion of 60% or more.

In addition, the catalyst according to the present invention is demanded to constantly convert carbon monoxide in the reformed gas within a certain temperature range. Table 3 shows the measurements of CO conversion and selectivity when the platinum-ruthenium-on-mordenite catalyst of the present invention and other catalysts are used at reaction temperatures of 150° C. and 200° C.

TABLE 3

| Catalyst (Carrier) | Reaction temperature (° C.) | CO conversion (%) | $O_2$ conversion (%) | Selectivity (%) |
|---|---|---|---|---|
| Pt-30% Ru | 200 | 80.4 | 100.0 | 80.4 |
| (Mordenite) | 150 | 89.7 | 100.0 | 89.7 |
| Pt | 200 | 79.2 | 100.0 | 79.2 |
| (Mordenite) | 150 | 7.0 | 9.8 | 71.4 |
| Ru | 200 | 100.0 | 100.0 | 100.0 |
| (Mordenite) | 150 | 57.0 | 58.0 | 98.7 |
| Pt | 200 | 51.0 | 100.0 | 51.0 |
| (Alumina) | 150 | 7.7 | 12.0 | 60.5 |

Composition of reformed gas:
  CO 1%, $O_2$ 0.5%, $H_2$ balance
Contact time of Pt catalyst:
  W/F 0.12 gscm$^{-3}$
  (W: 100 mg, F: 50 cm$^3$·min$^{-1}$)
Contact time of other catalysts:
  W/F 0.03 gscm$^{-3}$
  (W: 25 mg, F: 50 cm$^3$·min$^{-1}$)
Pt—30% Ru:
  Containing Ru in an amount of 30 at. %

As is apparent from Table 3, when a conventional platinum-on-alumna catalyst and a platinum-on-mordenite catalyst are used, CO conversion and $O_2$ conversion decrease drastically with a decrease of reaction temperature from 200° C. to 150° C. Even when a ruthenium-on-mordenite catalyst is used, the performance of the catalyst decreases drastically. In contrast, as is also apparent from Table 3, a platinum alloy catalyst containing a platinum—30 at. % ruthenium alone undergo least changes in performance in accordance with reaction temperature. This fact shows that the platinum-ruthenium catalyst is not affected by a change in reaction temperature. The phenomenon is observed when the platinum alloy catalyst contains ruthenium in an amount of 20–50 at. %. In addition, even when ruthenium is replaced by iron, cobalt, rhodium, nickel, manganese, tin, or molybdenum, the same tendency is exhibited.

As is apparent from the above results, only when mordenite serving as a carrier and a platinum—20–50 at. % alloy metal are used, there is produced an excellent, well-balanced catalyst for oxidizing a reformed gas, which is capable of selectively and specifically oxidizing carbon monoxide in the reformed gas.

When mordenite is used as a carrier and a platinum—20–50 at. % alloy metal is used as a catalyst, CO conversion (%), $O_2$ conversion, and selectivity (%) hardly vary with the flow rate of reformed gas, and the gas can be oxidized constantly. Table 4 shows that CO conversion and other characteristics are held constant with changes in the flow rate of reformed gas. In this case, platinum-on-mordenite, ruthenium-on-mordenite, and platinum-on-alumuna catalysts were compared with the platinum—20–50 at. % alloy-on-mordenite catalyst. The results are shown in Table 4.

TABLE 4

Reaction temperature: 150° C.

| Catalyst (Carrier) | Flow rate of reformed gas ($cm^3 \cdot min^{-1}$) | CO conversion (%) | $O_2$ conversion (%) | Selectivity (%) |
|---|---|---|---|---|
| Pt-30% Ru | 50 | 89.7 | 100.0 | 89.7 |
| (Mordenite) | 80 | 88.6 | 100.0 | 88.6 |
|  | 100 | 89.0 | 100.0 | 89.0 |
| Pt | 50 | 7.0 | 9.8 | 71.4 |
| (Mordenite) | 80 | 5.8 | 8.7 | 66.7 |
|  | 100 | 4.6 | 7.4 | 63.9 |
| Ru | 50 | 57.0 | 58.0 | 98.7 |
| (Mordenite) | 80 | 48.4 | 53.3 | 90.8 |
|  | 100 | 42.5 | 48.9 | 86.9 |
| Pt | 50 | 7.7 | 12.0 | 60.5 |
| (Alumina) | 80 | 6.2 | 11.8 | 52.5 |
|  | 100 | 5.7 | 11.5 | 49.6 |

The amount of supported catalyst:
  Pt—Ru catalyst
    W=25 mg
  Other catalysts
    W=100 mg
Pt—30% Ru:
  Containing Ru in an amount of 30 at. %

As is apparent from Table 4, only when the platinum-ruthenium catalyst containing a platinum—30% ruthenium alloy metal is used, the measured characteristics, including CO conversion, do not undergo wide fluctuation in the flow rate of the reformed gas, whereas when other catalysts are used, the measured characteristics decrease with an increase in the flow rate. Thus, conventional catalysts do not have ability to oxidize carbon monoxide in accordance with an increase in the flow rate of reformed gas. In contrast, the platinum-ruthenium catalyst can sufficiently oxidize carbon monoxide even when the flow rate varies, since the catalyst has ability to oxidize carbon monoxide rapidly.

In the present invention, mordenite is selected from different types of zeolite and is used as a carrier. The reasons are described below. As is described above, zeolite is classified into several types in accordance with the size of micro-pores. In this case, three types of zeolite; A-type, M-type (mordenite), and X-type, were evaluated in terms of ability to selectively oxidize carbon monoxide. The results of evaluation are shown in Table 5. In the table, M-type represents mordenite.

TABLE 5

Unit: %

| Carrier | Mean micro-pore size | CO conversion | $O_2$ conversion | Selectivity |
|---|---|---|---|---|
| X-type | 11 Å | 67.4 | 100.0 | 67.4 |
| M-type | 7 Å | 69.7 | 100.0 | 89.7 |
| A-type | 3 Å | 8.6 | 16.0 | 53.8 |

Reaction temperature:
  150° C.
Contact time:
  W/F 0.03 $gscm^{-3}$
  (W: 25 mg, F: 50 $cm^3 \cdot min^{-1}$)
Composition of reformed gas:
  CO 1%, $O_2$ 0.5%, $H_2$ balance As is apparent from Table 5, X-type zeolite having a larger pore size as compared with M-type zeolite (mordenite) provides poor CO conversion and selectivity, and A-type zeolite having a smaller pore size as compared with mordenite also provides poor CO conversion and selectivity. Accordingly, when the pore size is larger, contact frequency between carbon monoxide and the inner walls of the pores decreases within the pores, and residence time of carbon monoxide and oxygen in the pores becomes almost the same as that of hydrogen, and thus carbon monoxide is not selectively oxidized and hydrogen is consumed in large quantity. In contrast, when the pore size is smaller, the reformed gas experiences difficulty in entering the pores, and catalytic oxidation predominantly occurs on the surface of zeolite, and thus carbon monoxide is not selectively oxidized. Therefore, M-type (mordenite) having appropriate pore size is the best suited for use for forming a catalyst for oxidizing the reformed gas.

As is described above, when mordenite is used as a carrier and a platinum—20–50 at. % alloy metal is used as a catalyst component, there can be obtained an excellent catalyst for oxidizing the reformed gas, which catalyst is capable of selectively oxidizing carbon monoxide in the reformed gas with high accuracy, with other requirements being met in a well-balanced manner. The present invention will next be described in more detail by way of examples.

EXAMPLES

Preferred embodiments of the catalyst for oxidizing the reformed gas according to the present invention are described below. Mordenite, serving as a carrier, used in the examples was prepared through a general ion exchange method.

Example 1

In this example, sodium-substituted type mordenite was used as a carrier, and a platinum-ruthenium alloy was supported by the mordenite. The method for supporting the catalyst is described below.

[Pt(NH$_3$)$_4$]Cl$_2$ and [Ru(NH$_3$)$_6$]Cl$_3$ were used for ion exchange with a mordenite carrier, and a platinum—30 at. % ruthenium alloy metal serving as a catalyst component was supported by the carrier. Subsequently, the thus-obtained catalytic substance was subjected to oxidation under an oxygen atmosphere at 500° C. for one hour, to thereby obtain a catalyst for oxidizing the reformed gas used for the PEFC.

The thus-obtained catalyst was evaluated for the ability to oxidize the reformed gas (CO 1%, $O_2$ 0.5% $H_2$ balance). The results are shown in Table 6. It was found that the catalyst can selectively oxidize carbon monoxide in a percentage of 90% or more. In addition, the catalyst can selectively and constantly oxidize carbon monoxide at a lower temperature of 150° C.

Example 2

Mordenite, serving as a carrier, used in the example was prepared through a general ion exchange method, and a platinum-iron alloy was supported by the mordenite. The method for supporting the catalyst is described below.

[Pt(NH$_3$)$_4$]Cl$_2$ and Fe(NO$_3$)$_3$ were used for ion exchange with a mordenite carrier, and a platinum—30 at. % iron alloy metal serving as a catalyst component was supported by the carrier. Subsequently, the thus-obtained catalytic substance was subjected to oxidation under an oxygen atmosphere at 500° C. for one hour, to thereby obtain a catalyst for oxidizing the reformed gas used for the PEFC.

The thus-obtained catalyst was evaluated for the ability to oxidize the reformed gas (CO 1%, O$_2$ 0.5%, H$_2$ balance). The results are shown in Table 6, together with other results. It was found that although the platinum-iron catalyst has poor ability as compared with the above platinum-ruthenium catalyst, the platinum-iron catalyst can selectively oxidize carbon monoxide at constant and high efficiency as compared with a conventional catalyst for oxidizing the reformed gas. In addition, the platinum-iron catalyst can selectively oxidize carbon monoxide at a lower temperature of 150° C. in a percentage of 80% or more.

Furthermore, the present inventor produced a platinum-on-alumina catalyst for oxidizing the reformed gas, in order to compare the performance of a conventional catalyst for oxidizing the reformed gas and the performance of catalysts for oxidizing the reformed gas according to the present invention, which was obtained in the respective Examples. For production of the platinum-on-alumina catalyst, a catalyst was supported by means of a general impregnation method wherein alumina is treated with a solution of chloroplatinic acid. The thus-obtained catalyst was evaluated for the ability to oxidize the reformed gas (CO 1%, O$_2$ 0.5%, H$_2$ balance). The results are shown in Table 6 together with other results.

TABLE 6

| Catalyst (Carrier) | Reaction temperature (° C.) | CO conversion (%) | O$_2$ conversion (%) | Selectivity (%) |
| --- | --- | --- | --- | --- |
| Pt-30% RU (Mordenite) | 200 | 80.4 | 100.0 | 80.4 |
|  | 150 | 89.7 | 100.0 | 89.7 |
| Pt-30% Fe (Mordenite) | 200 | 63.1 | 100.0 | 63.1 |
|  | 150 | 82.4 | 100.0 | 82.4 |
| RU (Mordenite) | 200 | 100.0 | 100.0 | 100.0 |
|  | 150 | 57.0 | 58.0 | 98.7 |
| Pt (Alumina) | 200 | 51.0 | 100.0 | 51.0 |
|  | 150 | 7.7 | 12.0 | 60.5 |

Composition of reformed gas:
  CO 1%, O$_2$ 0.5%, H$_2$ balance
Contact time of Pt catalyst:
  W/F 0.03 gscm$^{-3}$
  (cat: 25 mg, F: 50 cm$^3$·min$^{-1}$)
Contact time of other catalysts:
  W/F 0.03 gscm$^{-3}$
  (cat: 25 mg, F: 50 cm$^3$·min$^{-1}$)
Pt—30%Ru:
  Containing Ru in an amount of 30 at. %
Pt—30% Fe is represented in the same way.

Effects of the Invention

As is described above, the present invention provides a catalyst for oxidizing a reformed gas, which catalyst has excellent ability to selectively oxidize carbon monoxide and provides constant catalysis performance, realizing well-balanced performances as compared with a conventional catalyst. Pre-treatment of the reformed gas by use of the catalyst according to the present invention can prevent the poisoning of the PEFC caused by carbon monoxide, and eliminate the variance in PEFC performance attributed to the reformed gas. In addition, application of the catalyst of the present invention to an electric automobile can greatly contribute to realization of a ZEV having the same performance and the ability to run as far as the present gasoline-fueled automobile.

What is claimed is:

1. A catalyst for oxidizing a reformed gas for removing carbon monoxide contained in the reformed gas, comprising
   a zeolite-containing carrier and a platinum alloy carried thereon,
   wherein the zeolite containing carrier is mordenite, and
   wherein the platinum alloy consists essentially of platinum and 20–50 at. % of a second metal other than platinum, wherein the second metal is at least one member selected from the group consisting of ruthenium, iron, rhodium, cobalt, molybdenum, nickel and manganese.

2. The catalyst of claim 1, wherein said alloy metal other than platinum is ruthenium.

3. The catalyst of claim 1, wherein said alloy metal other than platinum is iron.

4. The catalyst of claim 1, wherein said mordenite has a mean pore size of about 7 Å.

5. The catalyst of claim 1, wherein said reformed gas is hydrogen gas.

6. The catalyst of claim 1, wherein said amount of alloy metal other than platinum contained in the platinum alloy is 30–40 at. %.

7. The catalyst of claim 1, wherein said catalyst is adapted to convert at least 60% carbon monoxide.

8. A method of removing carbon monoxide from reformed gas comprising selectively oxidizing carbon monoxide by contacting the reformed gas with a catalyst according to claim 1.

9. A catalyst for oxidizing a reformed gas for removing carbon monoxide, comprising
   a zeolite-containing carrier and a platinum alloy carried thereon, wherein the zeolite containing carrier is mordenite and the amount of alloy metal other than platinum contained in the platinum alloy is 20–50 at. %, wherein said catalyst exhibits the property of selectively oxidizing carbon monoxide in a reformed gas.

10. A catalyst for oxidizing a reformed gas according to claim 9, wherein the alloy metal other than platinum of the platinum alloy is selected from the group consisting of ruthenium, iron, rhodium, cobalt, molybdenum, nickel and manganese.

11. The catalyst of claim 10, wherein said alloy metal other than platinum is ruthenium.

12. The catalyst of claim 10, wherein said alloy metal other than platinum is iron.

13. The catalyst of claim 9, wherein said mordenite has a mean pore size of about 7 Å.

14. The catalyst of claim 9, wherein said reformed gas is hydrogen gas.

15. The catalyst of claim 9, wherein said amount of alloy metal other than platinum contained in the platinum alloy is 30–40 at. %.

16. The catalyst of claim 9, wherein said catalyst is adapted to convert at least 60% carbon monoxide.

17. A method of removing carbon monoxide from reformed gas comprising selectively oxidizing carbon monoxide by contacting the reformed gas with a catalyst according to claim 9.

18. In a platinum containing catalyst supported by a mordenite carrier for the selective oxidation of carbon monoxide the improvement comprising using as the catalyst an alloy containing platinum, and a second metal other than platinum, wherein the second metal is present in an amount of 20–50 at. %.

19. A catalyst for oxidizing a reformed gas for removing carbon monoxide contained in the reformed gas, comprising a zeolite-containing carrier and a platinum alloy carried thereon, wherein the zeolite containing carrier is mordenite, and wherein said platinum alloy comprises at least about 50 at. % platinum and 20–50 at. % of ruthenium, iron, cobalt, molybdenum, nickel or manganese.

20. A method for removing carbon monoxide from a reformed gas comprising providing a platinum alloy catalyst supported by a mordenite carrier, wherein said platinum alloy comprises platinum and 20–50 at. % of an alloy metal other than platinum, and contacting said reformed gas with said catalyst.

* * * * *